No. 684,850. Patented Oct. 22, 1901.
L. F. NAFIS.
TESTING DEVICE.
(Application filed May 29, 1901.)
(No Model.)

Witnesses:
Inventor:
Louis F. Nafis
by atty Paul Synnestvedt

THE NORRIS PETERS CO., PHOTO-LITHO., WASHINGTON, D. C.

UNITED STATES PATENT OFFICE.

LOUIS F. NAFIS, OF CHICAGO, ILLINOIS.

TESTING DEVICE.

SPECIFICATION forming part of Letters Patent No. 684,850, dated October 22, 1901.

Application filed May 29, 1901. Serial No. 62,362. (No model.)

*To all whom it may concern:*

Be it known that I, LOUIS F. NAFIS, a citizen of the United States of America, residing at Chicago, Cook county, Illinois, have invented certain new and useful Improvements in Testing Devices, of which the following, taken in connection with the accompanying drawings, is a specification.

This invention has reference to devices for testing the graduations in the necks of fluid-receptacles, such as the well-known Babcock milk-bottle, and is intended to be used in place of the unhandy and difficult mercury test heretofore well-known or in place of the employment of such methods as require various auxiliary attachments—such as pipettes, mercury, corks, &c.

A further object of my invention is to simplify the testing operation and also to reduce the expense of the testing device.

The above, as well as such other objects as may hereinafter appear, are attained by means of a construction which I have illustrated in preferred form in the accompanying drawings, and in which—

Figure 1:
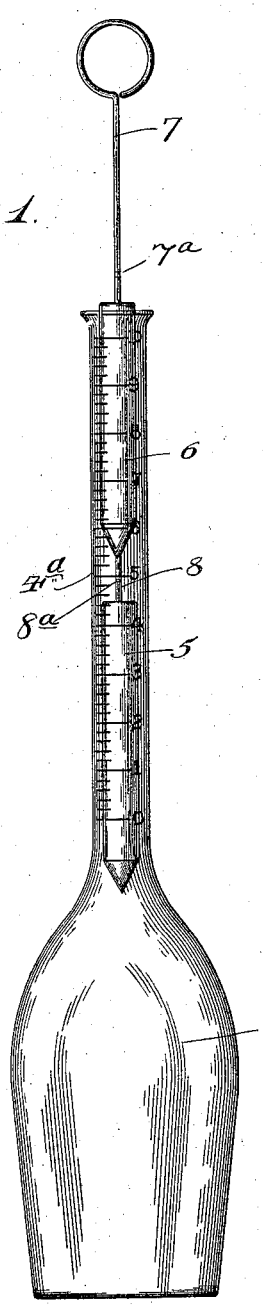
Figure 2:
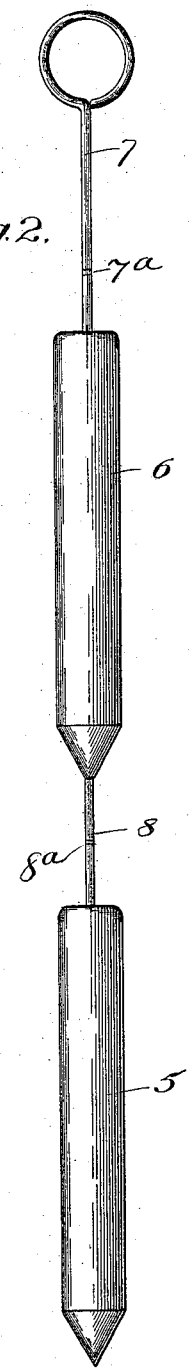
Figure 3:
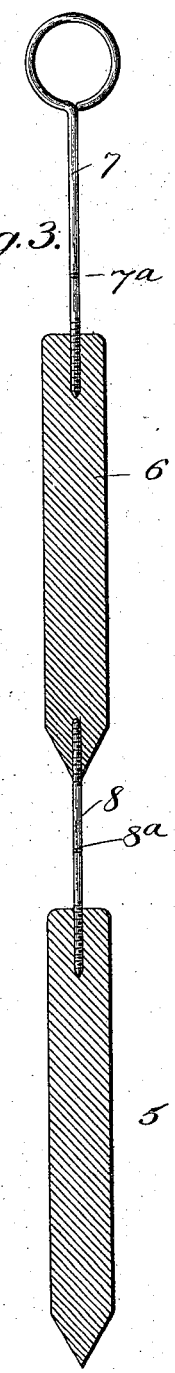

Figure 1 is a representation of a Babcock milk-bottle having the neck provided with the graduated scale. Fig. 2 is an enlarged view of a testing device, and Fig. 3 is an enlarged view of the same shown in sections.

Referring now more particularly to Fig. 1, it will be seen that a bottle provided with a neck having a graduated scale marked thereon is shown, with the testing device in position within the neck of the bottle. The testing device itself comprises, essentially, a handle or stem 7 and a plurality of displacement-sections, which I have marked 5 and 6, these sections being preferably connected together by means of a screw-threaded stem or connection 8 of small diameter, as clearly shown in Fig. 3.

The operation of my invention is as follows: Taking a vessel to be tested, such as the vessel 4 in Fig. 1, the same is filled with fluid, either water or, if it be a milk-bottle, preferably milk, up to the mark "0." The tester is then inserted in the position shown and pushed downward until the section or displacement-piece marked 5 is entirely immersed in the liquid and the liquid rises to the point $8^a$ and the liquid has risen to the proper point on the connecting-piece, at which time, if the bottle is accurately made, the liquid will rise to the proper position on the scale $4^a$. To make another test without removing the device from the bottle, the displacement-section 6 is then pushed down until it is completely immersed and the liquid rises to the point $7^a$, when, if the bottle be correct, the liquid will rise and reach the proper level upon the scale $4^a$, as before. If the bottle is not correct, the liquid will rise either above or below the proper indicating-mark on the scale for the immersion of the one or the other displacement-section, and the test can be relied upon as absolutely accurate, since the volume or cubical contents of the displacement-sections is a fixed quantity or of standard known volume.

Having thus described my invention, what I claim as new, and desire to secure by Letters Patent, is—

1. A testing device for graduated scales on fluid-containing vessels, comprising a plurality of displacement-sections of standard known volumes, a handle secured thereto, and a connection between said displacement-sections, substantially as described.

2. A testing device for receptacles containing graduated scales for measuring fluid contained in said receptacles, comprising a displacement-section of standard known volumes and adapted to be totally immersed in said liquid and a handle therefor whereby the section can be inserted into the liquid, and the same caused to register upon the scale the amount of displacement caused by the displacement-section, substantially as described.

3. A testing device for determining the accuracy of the graduations on the necks of bottles, and sides of other fluid-receptacles, comprising a plurality of displacement-sections of standard known volumes and of relatively large diameters, a connection between two adjacent displacement-sections of relatively much smaller diameter, and a stem or handle for inserting the same into the vessel to be tested, substantially as described.

In testimony whereof I have hereunto set my hand in the presence of two subscribing witnesses.

LOUIS F. NAFIS.

In presence of—
PAUL SYNNESTVEDT,
PAUL CARPENTER.